United States Patent
Park

(10) Patent No.: US 9,027,328 B2
(45) Date of Patent: May 12, 2015

(54) EXHAUST GAS PURIFICATION SYSTEM FOR VEHICLE AND REGENERATION CONTROL METHOD THEREOF

(71) Applicant: Hyundai Motor Company, Seoul (KR)

(72) Inventor: Jun Sung Park, Yongin (KR)

(73) Assignee: Hyundai Motor Company, Seoul (KR)

( * ) Notice: Subject to any disclaimer, the term of this patent is extended or adjusted under 35 U.S.C. 154(b) by 77 days.

(21) Appl. No.: 13/799,735

(22) Filed: Mar. 13, 2013

(65) Prior Publication Data

US 2014/0102078 A1  Apr. 17, 2014

(30) Foreign Application Priority Data

Oct. 11, 2012  (KR) .......................... 10-2012-0113147

(51) Int. Cl.
| | | |
|---|---|---|
| *F01N 3/00* | (2006.01) | |
| *F01N 3/02* | (2006.01) | |
| *F01N 3/10* | (2006.01) | |
| *F01N 3/023* | (2006.01) | |
| *F01N 3/08* | (2006.01) | |
| *F02D 41/02* | (2006.01) | |
| *F01N 9/00* | (2006.01) | |

(52) U.S. Cl.
CPC .............. *F01N 3/023* (2013.01); *F01N 3/0807* (2013.01); *F01N 3/0814* (2013.01); *F01N 3/0842* (2013.01); *F01N 3/0871* (2013.01); *F01N 3/0885* (2013.01); *F02D 41/028* (2013.01); *F02D 41/029* (2013.01); *F01N 9/002* (2013.01); *F01N 2430/06* (2013.01); *F02D 2200/0812* (2013.01); *F02D 2250/36* (2013.01); *Y02T 10/47* (2013.01); *Y02T 10/24* (2013.01)

(58) Field of Classification Search
CPC ....... F01N 3/023; F01N 3/087; F01N 3/0814; F01N 3/0842; F01N 3/0871; F01N 3/0885; F01N 9/002; F01N 2430/06; F02D 41/028; F02D 41/029
USPC ............ 60/274, 285, 286, 295, 297, 301, 311
See application file for complete search history.

(56) References Cited

U.S. PATENT DOCUMENTS

| | | |
|---|---|---|
| 2005/0129601 A1 | 6/2005 | Li et al. |
| 2006/0070373 A1 | 4/2006 | Huang et al. |
| 2009/0087364 A1 | 4/2009 | Odajima et al. |

FOREIGN PATENT DOCUMENTS

| | | | |
|---|---|---|---|
| DE | 10164931 B4 * | 7/2011 | ................ F01N 9/00 |
| EP | 1 433 932 A1 | 6/2004 | |

(Continued)

*Primary Examiner* — Audrey K Bradley
(74) *Attorney, Agent, or Firm* — Morgan, Lewis & Bockius LLP

(57) ABSTRACT

An exhaust gas purification system and a regeneration control method thereof is configured to determine whether a regeneration condition of particulate filter is satisfied through vehicle information to regenerate the particulate filter until particulate matter has reached a predetermined reference amount by increasing temperature of exhaust gas when a regeneration condition is satisfied, to maintain temperature of lean NOx trap in a range of a predetermined reference temperature when regeneration of the particulate filter has reached the predetermined reference amount, to provide desulfurization performed to the lean NOx trap during rich burn, and regeneration where the particulate matter during lean burn is removed according to engine being controlled to drive such that lean burn and rich burn are repeatedly and alternately performed, and to control engine to drive by a normal burn when the desulfurization of the lean NOx trap and the regeneration of the particulate filter are completed.

15 Claims, 3 Drawing Sheets

(56) References Cited

FOREIGN PATENT DOCUMENTS

| | | | |
|---|---|---|---|
| EP | 1 873 365 A1 | 2/2008 | |
| FR | 2 933 446 A1 | 1/2008 | |
| FR | 2933446 A1 * | 1/2010 | ............ F01N 11/00 |
| JP | 2007-527314 A | 9/2007 | |
| KR | 10-2007-0049859 A | 5/2007 | |
| KR | 10-2011-0024598 A | 3/2011 | |
| KR | 10-1048112 B1 | 7/2011 | |
| KR | 10-1158816 B1 | 6/2012 | |

* cited by examiner

EXHAUST GAS PURIFICATION SYSTEM FOR VEHICLE AND REGENERATION CONTROL METHOD THEREOF

CROSS-REFERENCE TO RELATED APPLICATION

The present application claims priority to Korean Patent Application No. 10-2012-0113147 filed on Oct. 11, 2012, the entire contents of which is incorporated herein for all purposes by this reference.

BACKGROUND OF THE INVENTION

1. Field of the Invention

The present invention relates to an exhaust gas purification system for a vehicle. More particularly, the present invention relates to an exhaust gas purification system for a vehicle, and a regeneration control method thereof, that is adapted to perform unifying control of regeneration and desulfurization, which are regeneration of a particulate filter that is adapted to trap particulate matter (PM) such as soot included in exhaust gas, and desulfurization of a lean NOx trap (LNT) that is adapted to absorb or adsorb nitrogen oxides (NOx).

2. Description of Related Art

A lean burn engine has been widely used for improving fuel consumption of a vehicle.

According to reinforcement of exhaust gas regulations, in a general vehicle having the lean burn engine, a lean NOx trap (LNT) is mounted at a rear end of an exhaust manifold and a particulate filter (PF) is mounted at a rear end of the LNT so as to reduce noxious exhaust gases.

The LNT absorbs or adsorbs nitrogen oxides (NOx) generated by the lean burn of an engine. In addition, the LNT reduces NOx to nitrogen gas ($N_2$), and then exhausts the $N_2$.

The NOx storage of the LNT is reduced or deteriorated by sulfur poisoning. Sulfur components are included in a fuel and engine oil. Therefore, purification performance of NOx should be recovered through desulfurization.

The particulate filter physically traps particulate matter (PM) such as soot included in exhaust gas, and then filters the trapped PM. In addition, the trapped and filtered PM are periodically regenerated according to the amount of trapped PM filtered by the PF, travel distance or time of a vehicle, or differential pressure between front and rear ends of the particular filter.

The regeneration of the particular filter is performed through combusting the trapped PM as the temperature of exhaust gas is increased to a high temperature of about 600° C. to 700° C.

Both the regeneration of the particular filter and the desulfurization of the LNT are performed at the high temperature of about 600° C. to 700° C.

Generally, the regeneration of the particular filter is performed when the temperature of the front end of the particular filter is increased to a high temperature, and then the desulfurization of the LNT is performed by using the high temperature.

The incomplete regeneration of the particular filter is minimized, when the desulfurization of the LNT is performed after complete regeneration of the particular filter. However, the time and amount of fuel consumed during the regeneration and the desulfurization are excessively increased, and thus fuel consumption may be deteriorated and generation of noxious exhaust gases may also rise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust gas purification system for a vehicle and a regeneration control method thereof having advantages of simultaneously controlling regeneration of a particulate filter and desulfurization of a lean NOx trap, and realizing enhancement of fuel consumption and minimization of noxious exhaust gas through the unifying control.

In an aspect of the present invention, an exhaust gas purification system for a vehicle may include an engine providing a lean burn, a lean NOx trap absorbing or adsorbing nitrogen oxide (NOx) may include d in exhaust gas exhausted from the engine, and purifying the absorbed or adsorbed nitrogen oxide by reduction, a particulate filter disposed downstream of the lean NOx trap and trapping particulate matter included in the exhaust gas exhausted from the engine, and a control unit controlling combustion of the engine, desulfurization of the lean NOx trap, and regeneration of the particulate filter, wherein the control unit regenerates the particulate filter by a reference amount ($m_{soot1}$), and then drives the engine such that lean burn and rich burn are repeatedly and alternately performed so as to perform unifying control to desulfurize sulfur components absorbed or adsorbed at the lean NOx trap and to regenerate the particulate filter.

The system may further include differential pressure detecting unit mounted at front and rear ends of the particulate filter, and detecting differential pressure of the exhaust gas inputted to the particulate filter and exhausted from the particulate filter, wherein the control unit determines regeneration condition of the particulate filter according to mileage determined by travel distance and time of the vehicle, or by an amount of trapped particulate matter determined according to the differential pressure transmitted from the differential pressure detecting unit.

The control unit is adapted to increase exhaust gas temperature by a predetermined amount temperature by using at least one among controlling an amount of fuel injected to the engine, controlling an amount of intake air flowing into the engine, or controlling fuel injection at a downstream of an exhaust manifold.

The control unit is adapted to increase exhaust gas temperature step by step so as to protect the particulate filter.

The control unit predetermines the reference amount ($m_{soot1}$) at which the particulate filter traps the particulate matter for starting desulfurization control of the lean NOx trap such that the particulate filter is not damaged by drop to idle (DTI) or DTO (Drop To Overrun).

The control unit maintains temperature of the lean NOx trap by a range of a predetermined reference temperature that is at least a minimum temperature ($T_{DeSOx,min}$) and at most a maximum temperature ($T_{DeSOx,max}$), and controls a drive of the engine such that the lean burn and the rich burn are repeatedly and alternately performed so as to desulfurize the lean NOx trap during the rich burn and regenerate the particulate matter during the lean burn which is not removed through the particulate filter when a trapped amount of the particulate matter may have reached the reference amount ($m_{soot1}$) by the regeneration of the particulate filter, wherein the control unit predetermines the minimum temperature ($T_{DeSOx,min}$) as a temperature at which the desulfurization is started from the lean NOx trap, and predetermines the maximum temperature ($T_{DeSOx,max}$) as a temperature at which performance of the lean NOx trap is assured.

The control unit determines that the regeneration is completed when the particulate matter of the particulate filter is regenerated to at most another predetermined reference amount ($m_{soot2}$), a regeneration time may have reached a set time ($t_{PF}$), or the differential pressure between front and rear ends of the particulate filter is decreased by at most a set level ($\Delta P_{PF}$).

The control unit determines that the desulfurization is completed when the sulfur components poisoning the lean NOx trap are removed by at most a predetermined set amount ($m_{SOx}$), a desulfurization time may have reached a set time ($t_{DeSOx, 1}$) or a time maintaining a state that an air-fuel ratio is rich ($\lambda<1$) during the desulfurization is reached to other set time ($t_{DeSOx, 2}$).

The control unit controls such that the engine is driven by only the lean burn so as to perform the regeneration of the particulate filter when the regeneration of the particulate filter is not completed even though desulfurization control of the lean NOx trap is completed.

In another aspect of the present invention, a regeneration control method of an exhaust gas purification system that is applied to an engine providing a lean burn and in which a lean NOx trap and a particulate filter are mounted at an exhaust manifold, the control method comprising determining whether a regeneration condition of the particulate filter is satisfied through information about a vehicle, regenerating the particulate filter until particulate matter may have reached a predetermined reference amount ($M_{soot1}$), by increasing temperature of exhaust gas when the regeneration condition is satisfied, maintaining temperature of the lean NOx trap in a range of a predetermined reference temperature when the regeneration of the particulate filter may have reached the predetermined reference amount ($m_{soot1}$), providing desulfurization which is performed to the lean NOx trap during a rich burn, and regeneration in which the particulate matter during the lean burn which is not removed through the particulate filter is removed according to the engine being controlled to drive such that the lean burn and the rich burn are repeatedly and alternately performed, and controlling the engine to drive by a normal burn when the desulfurization of the lean NOx trap and the regeneration of the particulate filter are completed.

The engine is controlled to drive by the lean burn when the regeneration of the particulate filter is not completed even though the desulfurization of the lean NOx trap is completed.

The regeneration condition of the particulate filter is determined according to a trapped amount of the particulate matter determined by information about differential pressure between front and rear ends of the particulate filter or mileage determined by travel distance and time of the vehicle.

Increase of exhaust gas temperature for the regeneration of the particulate filter is realized by using at least one among controlling an amount of fuel injected to the engine, controlling an amount of intake air flowing into the engine, or controlling fuel injection at a downstream of the exhaust manifold, and a stepwise increase of temperature is controlled for protecting the particulate filter.

Regeneration completion is determined when the particulate matter of the particulate filter is regenerated to another predetermined reference amount ($m_{soot2}$), a regeneration time may have reached a set time ($t_{PF}$), or a differential pressure between front and rear ends of the particulate filter is decreased by at most a set level ($\Delta P_{PF}$), wherein desulfurization completion is determined when sulfur components poisoning the lean NOx trap are removed by at most a predetermined set amount ($m_{SOx}$), a desulfurization time is reached to a set time ($t_{DeSOx, 1}$) or a time maintaining a state that an air-fuel ratio is rich ($\lambda<1$) during the desulfurization is reached to other set time ($t_{DeSOx, 2}$).

The exhaust gas purification system for the vehicle may include the engine providing the lean burn, the lean NOx trap absorbing or adsorbing nitrogen oxide (NOx) included in the exhaust gas exhausted from the engine, and purifying the absorbed or adsorbed nitrogen oxide by reduction, the particulate filter disposed downstream of the lean NOx trap and trapping the particulate matter included in the exhaust gas exhausted from the engine, and a control unit controlling combustion of the engine, the desulfurization of the lean NOx trap, and the regeneration of the particulate filter, wherein the control unit regenerates the particulate filter by the predetermined reference amount ($m_{soot1}$), and then drives the engine such that the lean burn and the rich burn are repeatedly and alternately performed so as to perform unifying control to desulfurize sulfur components absorbed or adsorbed at the lean NOx trap and to regenerate the particulate filter.

According to an exemplary embodiment of the present invention, time spent for the regeneration of the particulate filter and the desulfurization of the lean NOx trap may be shortened, and thus the amount of fuel consumed during the regeneration and the desulfurization can be minimized. Therefore, enhancement of fuel consumption and minimization of exhausted noxious gas can be realized.

In addition, according to an exemplary embodiment of the present invention, the regeneration of the particulate filter and the desulfurization of the lean NOx trap are simultaneously performed. Thus, the present invention decreases fuel consumption amount by about 10% to 35% as compared with a case that the regeneration and the desulfurization are separately performed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
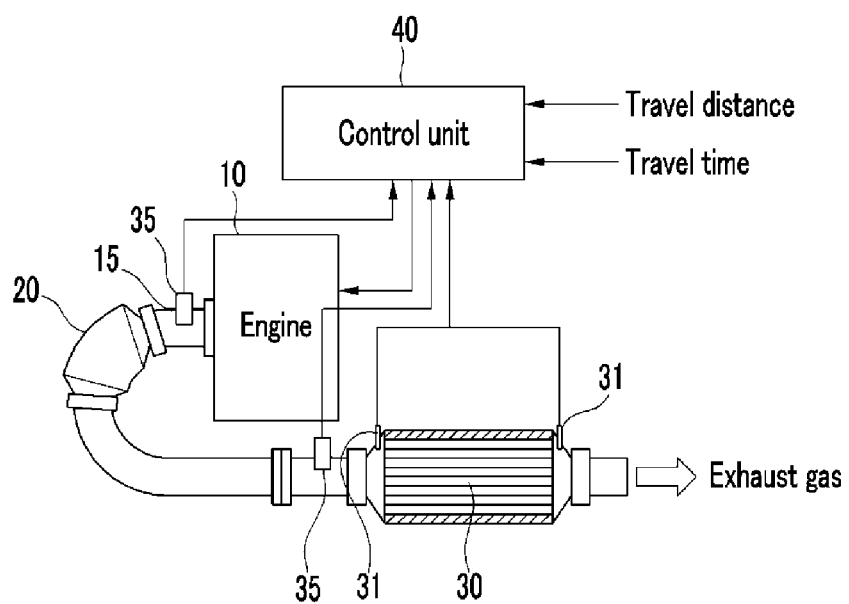
FIG. 1 schematically shows an exhaust gas purification system for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings such that a person skilled in the art can easily accomplish it.

As those skilled in the art would realize, the described embodiments may be modified in various different ways, all without departing from the spirit or scope of the present invention.

FIG. 1 schematically shows an exhaust gas purification system for a vehicle according to an exemplary embodiment of the present invention.

Referring to FIG. 1, an exhaust gas purification system for a vehicle according to an exemplary embodiment of the present invention includes an engine 10, a lean NOx trap (LNT) 20, a particulate filter (PF) 30, and a control unit 40.

The engine 10 is an internal combustion engine providing a lean burn. In addition, power is generated by the lean burn (air-fuel ratio>14.5) of a mixture of air and fuel that is lean according to control of the control unit 40. Further, high temperature exhaust gas generated through combustion of the mixture is purified by the lean NOx trap 20, and the particulate filter 30, and the purified exhaust gas is exhausted into the atmosphere.

The lean NOx trap 20 is mounted at a downstream of the exhaust manifold 15 of the engine 10 so as to absorb or adsorb nitrogen oxide (NOx) included in exhaust gas and store the absorbed or adsorbed NOx, and the NOx is reduced to nitrogen gas ($N_2$) which is harmless to a human body and then the $N_2$ is exhausted.

The lean NOx trap 20 is poisoned by sulfur components. The sulfur poisoning is generated by sulfur components included in fuel and engine oil. In addition, the NOx absorbing or adsorbing performance of the lean NOx trap 20 is deteriorated by the sulfur poisoning, and the NOx absorbing or adsorbing performance is recovered through desulfurization at a high temperature of about 600° C. to 700° C.

The particulate filter 30 physically traps the particulate matter (PM) such as the soot included in exhaust gas so as to exhaust it into the atmosphere.

The particulate filter 30 performs periodic regeneration to burn the trapped PM according to a trapped amount of the PM determined by differential pressure between front and rear ends thereof, or mileage calculated by travel distance and time.

The regeneration of the particulate filter 30 is adapted to increase the temperature of the exhaust gas to a high temperature of about 600° C. and to burn the trapped PM.

The front and rear ends of the particulate filter 30 are adapted to mount a differential pressure detecting unit 31 and a temperature detecting unit 35.

The differential pressure detecting unit 31 detects a differential pressure of exhaust gas respectively entering and exiting the particulate filter 30, and transmit the detected differential pressure information to the control unit 40 through an electrical signal.

The temperature detecting unit 35 detects the temperature of the particulate filter 30 and transmits the information about the detected temperature to the control unit 40 through an electrical signal.

The control unit 40 may determine whether the regeneration of the particulate filter 30 is required based on the trapped amount of the PM determined according to information about the differential pressure detected by the differential pressure detecting unit 31 mounted at the front and rear ends of the particulate filter 30, or the mileage calculated from travel distance and time.

The control unit 40 controls the regeneration by increasing the temperature of the exhaust gas to a predetermined set temperature of about 600° C. to 700° C. and burns the PM trapped in the particulate filter 30 when the regeneration condition of the particulate filter 30 is satisfied.

The control unit 40 is adapted to increase the temperature of the exhaust gas to a predetermined reference temperature by using at least one among controlling an amount of fuel injected to the engine 10, controlling an amount of intake air flowing into the engine 40, or controlling fuel injection at a rear end of the exhaust manifold 15.

That is, the control unit 40 increases the temperature of the exhaust gas such that the particulate filter 30 is regenerated by a predetermined set level, and then controls the driving of the engine 10 such that lean burn and rich burn are repeatedly and alternately performed so as to desulfurize the lean NOx trap 20 during the rich burn and regenerate the particulate filter 30 during the lean burn. Therefore, unifying control of the regeneration of the particulate filter 30 and the desulfurization of the lean NOx trap 20 control is performed such that fuel consumption amount and exhausted noxious materials are minimized.

If the control unit 40 determines that the regeneration of the particulate filter 30 is required, the control unit 40 increases the temperature of the exhaust gas to the predetermined set level and regenerates the PM trapped in the particulate filter 30 until the regeneration amount of the PM reaches a predetermined reference amount ($m_{soot1}$).

Herein, the control unit 40 determines whether the PM has reached the predetermined reference amount ($m_{soot1}$) during the regeneration of the particulate filter 30 by using information inputted from the differential pressure detecting unit 31.

That is, the control unit 40 analyzes differential pressure detected from the differential pressure detecting unit 31 and determines whether the trapped amount of the regenerated PM reaches the predetermined reference amount ($m_{soot1}$).

The control unit 40 is adapted to increase the temperature of the exhaust gas step by step so as to protect the particulate filter 30 in a case that the temperature of the exhaust gas is increased, and the predetermined reference amount ($m_{soot1}$) is predetermined by Drop To Idle (DTI) or DTO (Drop To Overrun) and so on such that the particulate filter 30 is not damaged.

If the trapped amount of the PM reaches the predetermined reference amount ($m_{soot1}$) by the regeneration of the particulate filter 30, the control unit 40 maintains the temperature of the lean NOx trap 20 in a predetermined range of a reference temperature that is at least the predetermined minimum temperature ($T_{DeSOx,min}$) and that is at most the predetermined maximum temperature ($T_{DeSOx,max}$).

Further, the control unit 40 controls the drive of the engine 10 such that the lean burn and the rich burn are repeatedly and alternately performed so as to perform the desulfurization of the lean NOx trap 20 during the rich burn and perform the regeneration of the PM such as soot during lean burn, which is not removed through the particulate filter 30.

In the reference temperature, the minimum temperature ($T_{DeSOx,min.}$) is predetermined as the temperature at which the desulfurization is started from the lean NOx trap 20, and the maximum temperature ($T_{DeSOx,max.}$) is predetermined as the temperature at which performance of the lean NOx trap can be assured.

If the desulfurization and the regeneration are completed while the lean burn driving and the rich burn driving are repeatedly and alternately performed such that the desulfurization of the lean NOx trap 20 and the regeneration of the particulate filter 30 are simultaneously controlled, the control unit 40 does not perform the repeated and alternate lean burn driving and rich burn driving, and performs normal control.

The control unit 40 may determine that regeneration is completed, in cases that the PM such as soot in the particulate filter 30 is regenerated to at most another predetermined reference amount ($m_{soot2}$), a regeneration time of the particulate filter 30 reaches a set time ($t_{PF}$) or a differential pressure between front and rear ends of the particulate filter 30 is decreased by at most a set level ($\Delta P_{PF}$).

The control unit 40 may determine that the desulfurization is completed, in cases that the sulfur components poisoning the lean NOx trap 20 are removed by at most a predetermined set amount ($m_{SOx}$), a desulfurization time of the lean NOx trap 20 reaches a set time ($t_{DeSOx, 1}$) or a time maintaining the state that an air-fuel ratio is rich ($\lambda$<1) during the desulfurization is reached to other set time ($t_{DeSOx, 2}$).

If the control unit 40 determines that the regeneration of the particulate filter 30 is not completed even though the desulfurization control of the lean NOx trap 20 is completed, the control unit 40 controls the engine 10 such that the repeated and alternate lean burn driving and rich burn driving are not performed and only the lean burn driving is performed, and thus performs the regeneration of the particulate filter 30.

Figure 2:
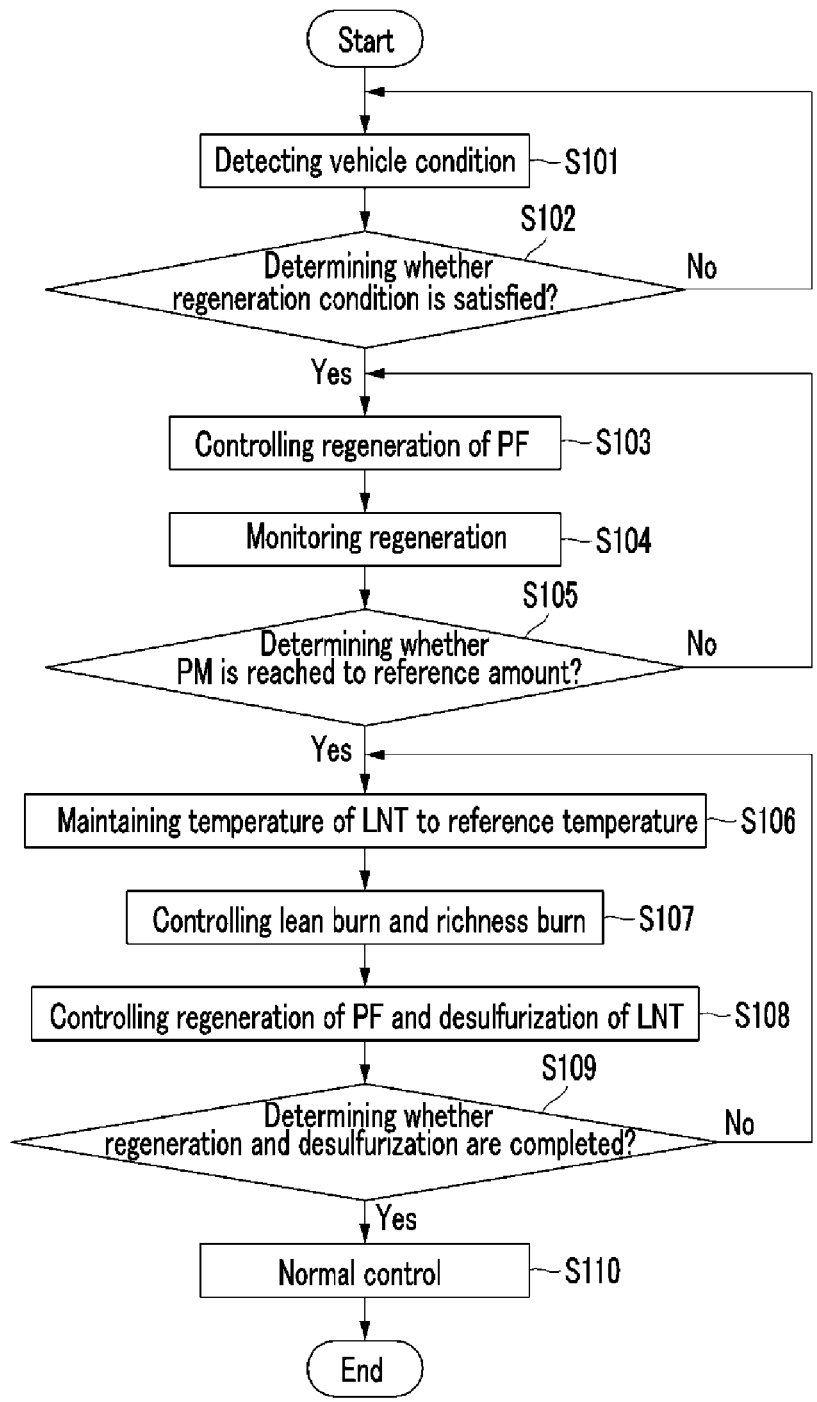
FIG. 2 is a flowchart of regeneration steps of an exhaust gas purification system for a vehicle according to an exemplary embodiment of the present invention.

A regeneration process of the exhaust gas purification system for a vehicle according to an exemplary embodiment of the present invention having the above-mentioned functions will be described referring to FIG. 2.

When the vehicle having the lean burn engine according to an exemplary embodiment of the present invention is driven, the control unit 40 detects information about conditions of the vehicle at step S101. In addition, the control unit 40 determines whether the regeneration condition of the particulate filter 30 is satisfied at step S102.

The regeneration condition of the particulate filter 30 is determined according to the trapped amount of the PM determined by information about differential pressure detected from the differential pressure detecting unit 31 mounted at both ends of the particulate filter 30, or the mileage calculated from travel distance and time.

If the regeneration condition of the particulate filter 30 is not satisfied at step S102, the regeneration process returns to step S101. Further, If the regeneration condition of the particulate filter 30 is satisfied at step S102, the control unit 40 increases the temperature of the exhaust gas to a predetermined set temperature, which is a high temperature of about 600° C. to 700° C., and controls the regeneration burning the PM trapped in the particulate filter 30 at step S103.

At step S103, the control unit 40 is adapted to increase the temperature of the exhaust gas by a predetermined reference temperature by using at least one among controlling an amount of fuel injected to the engine 10, controlling an amount of intake air flowing into the engine, or controlling fuel injection at a downstream of the exhaust manifold 15.

In addition, the control unit 40 performs monitoring of the regeneration of the particulate filter 30 at step S104, and determines whether the PM trapped in the particulate filter 30 has reached a predetermined reference amount ($m_{soot1}$) at step S105.

That is, the control unit 40 determines whether the regeneration of the PM trapped in the particulate filter 30 has completed by a set of amount.

In the regeneration process of the particulate filter 30, the control unit 40 determines whether the PM has reached the predetermined reference amount ($m_{soot1}$) by using information inputted from the differential pressure detecting unit 31.

That is, the control unit 40 analyzes the differential pressure detected from the differential pressure detecting unit 31 and determines whether the trapped amount of the regenerated PM has reached the predetermined reference amount ($m_{soot1}$).

The control unit 40 is adapted to increase the temperature of the exhaust gas step by step so as to protect the particulate filter 30 in a case that the temperature of the exhaust gas is increased, and the predetermined reference amount ($m_{soot1}$) is predetermined by Drop To Idle (DTI) or DTO (Drop To Overrun) an so on such that the particulate filter 30 is not damaged.

If the control unit 40 determines that the trapped amount of the PM has reached the predetermined reference amount ($m_{soot1}$) by the regeneration of the particulate filter 30 at step S105, the control unit 40 maintains a temperature of the lean NOx trap 20 in a predetermined range of a reference temperature that is at least the predetermined minimum temperature ($T_{DeSOx,min.}$) and at most the predetermined maximum temperature ($T_{DeSOx,max.}$) at step S106.

Further, the control unit 40 controls the drive of the engine 10 such that the lean burn and the rich burn are repeatedly and alternately performed in step S107 so as to perform the desulfurization of the lean NOx trap 20 during the rich burn and perform the regeneration of the PM such as soot which is not removed through the particulate filter 30 during lean burn at step S108.

In the reference temperature, the minimum temperature ($T_{DeSOx,min.}$) is predetermined as a temperature at which the desulfurization is started from the lean NOx trap 20, and the maximum temperature ($T_{DeSOx,max.}$) is predetermined as a temperature at which performance of the lean NOx trap can be assured.

The control unit 40 determines whether the desulfurization and the regeneration are completed while the lean burn driving and the rich burn driving are repeatedly and alternately performed such that the desulfurization of the lean NOx trap 20 and the regeneration of the particulate filter 30 are simultaneously controlled at step S109.

If the control unit 40 determines that the desulfurization of the lean NOx trap 20 and the regeneration of the particulate filter 30 are completed at step S109, the control unit 40 controls the engine 10 such that the repeated and alternate lean burn driving and rich burn driving are stopped and normal control is performed at step S110.

The control unit 40 may determine that the regeneration is completed in cases that the PM such as soot in the particulate filter 30 is regenerated to the other predetermined reference amount ($m_{soot2}$), the regeneration time of the particulate filter 30 has reached a set time ($t_{PF}$), or a differential pressure between the front and rear ends of the particulate filter 30 is decreased by at most a set level ($\Delta P_{PF}$).

Further, the control unit 40 may determine that the desulfurization is completed in cases that the sulfur components poisoning the lean NOx trap 20 are removed by at most a predetermined set amount ($m_{SOx}$), the desulfurization time of the lean NOx trap 20 has reached a set time ($t_{DeSOx, 1}$) or a time maintaining the state that an air-fuel ratio is rich ($\lambda<1$) during the desulfurization is reached to other set time ($t_{DeSOx,2}$).

Furthermore, if the control unit 40 determines that the regeneration of the particulate filter 30 is not completed even though the desulfurization control of the lean NOx trap 20 is completed, the control unit 40 controls the engine 10 such that the repeated and alternate lean burn driving and rich burn driving are not performed and only the lean burn driving is performed, and thus performs the regeneration of the particulate filter 30.

Figure 3:
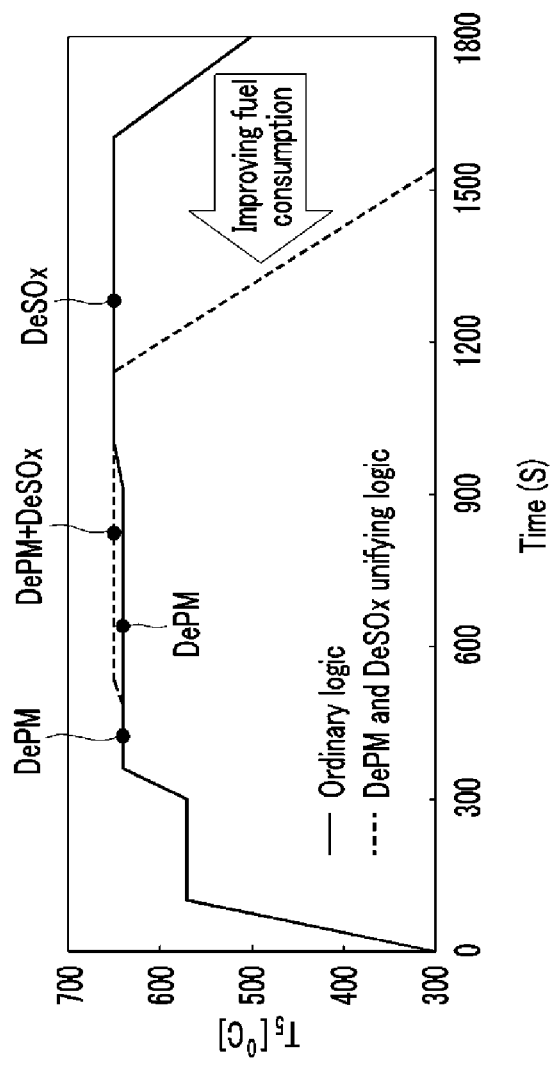
FIG. 3 is a graph that shows regeneration of an exhaust gas purification system for a vehicle according to an exemplary embodiment of the present invention.

Referring to FIG. 3, the case that the regeneration of the particulate filter 30 (DePM) and the desulfurization of the lean NOx trap 20 (DeSOx) are simultaneously controlled according to an exemplary embodiment of the present invention can shorten the regeneration time and decrease fuel consumption as compared with a case that regeneration of a particulate filter (DePM) and desulfurization of a lean NOx trap are separately performed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust gas purification system for a vehicle comprising:
   an engine providing a lean burn;
   a lean NOx trap absorbing or adsorbing nitrogen oxide (NOx) included in exhaust gas exhausted from the engine, and purifying the absorbed or adsorbed nitrogen oxide by reduction;
   a particulate filter disposed downstream of the lean NOx trap and trapping particulate matter included in the exhaust gas exhausted from the engine; and
   a control unit controlling combustion of the engine, desulfurization of the lean NOx trap, and regeneration of the particulate filter,
   wherein the control unit regenerates the particulate filter by a reference amount ($m_{soot1}$), and then drives the engine such that lean burn and rich burn are repeatedly and alternately performed so as to perform unifying control to desulfurize sulfur components absorbed or adsorbed at the lean NOx trap and to regenerate the particulate filter, and
   wherein the control unit controls such that the engine is driven by only the lean burn so as to perform the regeneration of the particulate filter when the regeneration of the particulate filter is not completed even though desulfurization control of the lean NOx trap is completed.

2. The system of claim 1, wherein the control unit is adapted to increase exhaust gas temperature by a predetermined amount temperature by using at least one among controlling an amount of fuel injected to the engine, controlling an amount of intake air flowing into the engine, or controlling fuel injection at a downstream of an exhaust manifold.

3. The system of claim 1, wherein the control unit is adapted to increase exhaust gas temperature step by step so as to protect the particulate filter.

4. The system of claim 1, wherein the control unit predetermines the reference amount ($m_{soot1}$) at which the particulate filter traps the particulate matter for starting desulfurization control of the lean NOx trap such that the particulate filter is not damaged by drop to idle (DTI) or DTO (Drop To Overrun).

5. The system of claim 1, wherein the control unit determines that the regeneration is completed when the particulate matter of the particulate filter is regenerated to at most another predetermined reference amount ($m_{soot2}$), a regeneration time has reached a set time ($t_{PF}$), or the differential pressure between front and rear ends of the particulate filter is decreased by at most a set level ($\Delta P_{PF}$).

6. The system of claim 1, wherein the control unit determines that the desulfurization is completed when the sulfur components poisoning the lean NOx trap are removed by at most a predetermined set amount ($m_{SOx}$), a desulfurization time has reached a set time ($t_{DeSOx,1}$) or a time maintaining a state that an air-fuel ratio is rich ($\lambda<1$) during the desulfurization is reached to other set time ($t_{DeSOx,2}$).

7. The system of claim 1, further comprising a differential pressure detecting unit mounted at front and rear ends of the particulate filter, and detecting differential pressure of the exhaust gas inputted to the particulate filter and exhausted from the particulate filter.

8. The system of claim 7, wherein the control unit determines a regeneration condition of the particulate filter according to mileage determined by travel distance and time of the vehicle, or by an amount of trapped particulate matter determined according to the differential pressure transmitted from the differential pressure detecting unit.

9. The system of claim 1, wherein the control unit maintains temperature of the lean NOx trap by a range of a predetermined reference temperature that is at least a minimum temperature ($T_{DeSOx,min.}$) and at most a maximum temperature ($T_{DeSOx,max.}$), and controls a drive of the engine such that the lean burn and the rich burn are repeatedly and alternately performed so as to desulfurize the lean NOx trap during the rich burn and regenerate the particulate matter during the lean burn which is not removed through the particulate filter when a trapped amount of the particulate matter has reached the reference amount ($m_{soot1}$) by the regeneration of the particulate filter.

10. The system of claim 9, wherein the control unit predetermines the minimum temperature ($T_{DeSOx,min.}$) as a temperature at which the desulfurization is started from the lean NOx trap, and predetermines the maximum temperature ($T_{DeSOx,max.}$) as a temperature at which performance of the lean NOx trap is assured.

11. A regeneration control method of an exhaust gas purification system that is applied to an engine providing a lean burn and in which a lean NOx trap and a particulate filter are mounted at an exhaust manifold, the control method comprising:
   determining whether a regeneration condition of the particulate filter is satisfied through information about a vehicle;
   regenerating the particulate filter until particulate matter has reached a predetermined reference amount ($m_{soot1}$), by increasing temperature of exhaust gas when the regeneration condition is satisfied;
   maintaining temperature of the lean NOx trap in a range of a predetermined reference temperature when the regeneration of the particulate filter has reached the predetermined reference amount ($m_{soot1}$);
   providing desulfurization which is performed to the lean NOx trap during a rich burn, and regeneration in which the particulate matter during the lean burn which is not removed through the particulate filter is removed according to the engine being controlled to drive such that the lean burn and the rich burn are repeatedly and alternately performed; and controlling the engine to drive by a normal burn when the desulfurization of the lean NOx trap and the regeneration of the particulate filter are completed, wherein the engine is controlled to drive by the lean burn when the regeneration of the particulate filter is not completed even though the desulfurization of the lean NOx trap is completed.

12. The control method of claim 11, wherein the regeneration condition of the particulate filter is determined according to a trapped amount of the particulate matter determined by information about differential pressure between front and rear ends of the particulate filter or mileage determined by travel distance and time of the vehicle.

13. The control method of claim 11, wherein increase of exhaust gas temperature for the regeneration of the particulate filter is realized by using at least one among controlling an amount of fuel injected to the engine, controlling an amount of intake air flowing into the engine, or controlling fuel injection at a downstream of the exhaust manifold, and a stepwise increase of temperature is controlled for protecting the particulate filter.

14. The control method of claim 11, wherein regeneration completion is determined when the particulate matter of the particulate filter is regenerated to another predetermined reference amount ($m_{soot2}$), a regeneration time has reached a set time ($t_{PF}$), or a differential pressure between front and rear ends of the particulate filter is decreased by at most a set level ($\Delta P_{PF}$), and wherein desulfurization completion is determined when sulfur components poisoning the lean NOx trap are removed by at most a predetermined set amount ($m_{SOx}$), a desulfurization time is reached to a set time ($t_{DeSOx,1}$) or a time maintaining a state that an air-fuel ratio is rich ($\lambda<1$) during the desulfurization is reached to other set time ($t_{DeSOx,2}$).

15. The control method of claim 11, wherein the exhaust gas purification system for the vehicle includes:

the engine providing the lean burn;

the lean NOx trap absorbing or adsorbing nitrogen oxide (NOx) included in the exhaust gas exhausted from the engine, and purifying the absorbed or adsorbed nitrogen oxide by reduction;

the particulate filter disposed downstream of the lean NOx trap and trapping the particulate matter included in the exhaust gas exhausted from the engine; and a control unit controlling combustion of the engine, the desulfurization of the lean NOx trap, and the regeneration of the particulate filter, wherein the control unit regenerates the particulate filter by the predetermined reference amount ($m_{soot1}$), and then drives the engine such that the lean burn and the rich burn are repeatedly and alternately performed so as to perform unifying control to desulfurize sulfur components absorbed or adsorbed at the lean NOx trap and to regenerate the particulate filter.

* * * * *